United States Patent
Manetakis

(10) Patent No.: US 8,600,335 B2
(45) Date of Patent: Dec. 3, 2013

(54) RECEIVER COMPRISING A PLURALITY OF SELECTABLE RECEIVE PATHS

(75) Inventor: Konstantinos Manetakis, Cambridge (GB)

(73) Assignee: Cambridge Silicon Radio Ltd., Cambridge (GB)

(*) Notice: Subject to any disclaimer, the term of this patent is extended or adjusted under 35 U.S.C. 154(b) by 0 days.

(21) Appl. No.: 13/328,633

(22) Filed: Dec. 16, 2011

(65) Prior Publication Data

US 2012/0202445 A1 Aug. 9, 2012

(30) Foreign Application Priority Data

Feb. 8, 2011 (GB) .................................. 1102143.3

(51) Int. Cl.
 *H04B 1/16* (2006.01)
(52) U.S. Cl.
 USPC ........ 455/341; 455/333; 455/334; 455/188.1; 333/101; 333/126; 333/132; 333/185
(58) Field of Classification Search
 USPC ............. 455/552.1, 83, 333, 341, 334, 188.1; 343/860, 904; 333/126, 101, 132, 185
 See application file for complete search history.

(56) References Cited

U.S. PATENT DOCUMENTS

| | | | | |
|---|---|---|---|---|
| 3,766,560 A | * | 10/1973 | Bornhorst et al. | 342/428 |
| 7,015,870 B2 | * | 3/2006 | Guitton et al. | 343/860 |
| 7,057,472 B2 | * | 6/2006 | Fukamachi et al. | 333/101 |
| 2004/0251985 A1 | * | 12/2004 | Guitton et al. | 333/126 |
| 2007/0232241 A1 | * | 10/2007 | Carley et al. | 455/83 |
| 2008/0079653 A1 | * | 4/2008 | Ahn et al. | 343/904 |
| 2008/0299930 A1 | | 12/2008 | Rofougaran et al. | |
| 2009/0291647 A1 | | 11/2009 | Tang et al. | |
| 2010/0105425 A1 | * | 4/2010 | Asokan | 455/552.1 |
| 2011/0234295 A1 | * | 9/2011 | Uejima et al. | 327/407 |

FOREIGN PATENT DOCUMENTS

| | | |
|---|---|---|
| EP | 1655851 | 5/2006 |
| EP | 1959574 | 8/2008 |
| JP | 2002124638 | 4/2002 |

OTHER PUBLICATIONS

European Search Report for European Appln. No. EP 11193377, dated Sep. 5, 2012.

\* cited by examiner

*Primary Examiner* — Junpeng Chen
(74) *Attorney, Agent, or Firm* — RatnerPrestia

(57) ABSTRACT

A receiver comprising: an antenna for receiving signals in a plurality of frequency bands; an integrated circuit including a plurality of amplifiers, wherein each of the plurality of amplifiers is configured to amplify signals in one of the plurality of frequency bands; and a plurality of selectable receive paths, each of the plurality of selectable receive paths connecting an output of the antenna to an input of one of the plurality of amplifiers and including a resonant circuit.

13 Claims, 3 Drawing Sheets

RECEIVER COMPRISING A PLURALITY OF SELECTABLE RECEIVE PATHS

TECHNICAL FIELD

The present invention relates to a receiver, and in particular to a receiver which is capable of receiving signals in a plurality of different frequency bands.

BACKGROUND TO THE INVENTION

Multi-band radio receivers, that is to say radio receivers that are capable of receiving signals in two or more frequency bands, may be implemented using integrated circuits (chips) in devices such as mobile telephones and the like.

Such receivers often require filters external to the chip to reduce the effects of strong out-of-band blocking signals on the performance of the chip. Such blocking signals may arise, for example, from transmitters located close to the chip in a device in which the chip is used.

Typically, SAW (surface acoustic wave) filters are used to filter out such out-of-band blocking signals. A typical receiver architecture having three receive paths, only one of which is operational at any one time, is illustrated schematically in FIG. 1. In the architecture 10 of FIG. 1, a multi-resonant antenna 12 is able to receive signals in three different frequency bands. The output of the antenna 12 is connected to parallel SAW filters 14, 16, 18, which are external to a chip in which parallel low noise amplifiers (LNAs) 20, 22, 24 are implemented.

Each of the LNAs 20, 22, 24 is configured to operate in one of the frequency bands of the antenna 12, and receives at its input the output of a respective one of the SAW filters 14, 16, 18, which are configured to pass signals in the frequency band of interest and to attenuate out-of-band signals strongly.

The outputs of the LNAs 20, 22, 24 are fed to an input of a common buffer 26, via a common output resonator or tank circuit made up of a variable capacitor 28 and an inductor 30 connected in parallel between a supply voltage and the input of the buffer 26. The common output tank circuit can be tuned using the variable capacitor 28 to select its centre frequency.

A problem with architectures such as the one illustrated in FIG. 1 is that the bill of materials (BOM) cost can be high, as it is dominated by components external to the chip, and in particular by the SAW filters 14, 16, 18. Thus, it would be desirable to provide a receiver architecture which provides attenuation of out-of-band blocking signals without using costly SAW filters.

SUMMARY OF INVENTION

According to a first aspect of the present invention there is provided a receiver comprising: an antenna for receiving signals in a plurality of frequency bands; an integrated circuit including a plurality of amplifiers, wherein each of the plurality of amplifiers is configured to amplify signals in one of the plurality of frequency bands; and a plurality of selectable receive paths, each of the plurality of selectable receive paths connecting the output of the antenna to an input of one of the plurality of amplifiers and including a resonant circuit.

The receiver of the present invention can be used to provide a multi-band receiver architecture which can strongly attenuate out-of-band blocking signals. Received signals outside the frequency band of interest are rejected by the resonant circuit of the selected receive path and are diverted away from the active (selected) receive path by the unselected receive paths thereby reducing the effect of out of band signals on the desired signal. This is achieved using inexpensive passive components instead of costly SAW filters as used in known receiver architectures.

The resonant circuit of each of the selectable receive paths may include an inductor which is external to the integrated circuit.

Alternatively, the resonant circuit of each of the selectable receive paths may include an inductor which is internal to the integrated circuit.

The resonant circuit may include a capacitor.

The integrated circuit may include the capacitor.

The resonant circuit may be a series resonant circuit.

Each of the plurality of selectable receive paths may be selectable by means of a switch which, when closed, connects the receive path to ground so as to deselect the receive path.

The receiver may further comprise a further resonant circuit for compensating for parasitic capacitance at input pads of the integrated circuit.

The further resonant circuit may be a parallel resonant circuit.

The further resonant circuit may include an inductor.

The inductor of the further resonant circuit may be external to the integrated circuit.

The further resonant circuit may include a capacitor.

The plurality of amplifiers may be low noise amplifiers.

Each of the plurality of receive paths may further comprise a termination resistor connected between the input of the amplifier and ground such that if the receive path is not selected signals from the antenna pass through the termination resistor to ground.

The termination resistor may be a passive device.

Alternatively, the termination resistor may be an active device.

BRIEF DESCRIPTION OF THE DRAWINGS

Embodiments of the invention will now be described, strictly by way of example only, with reference to the accompanying drawings, of which.

DESCRIPTION OF THE EMBODIMENTS

Figure 1:
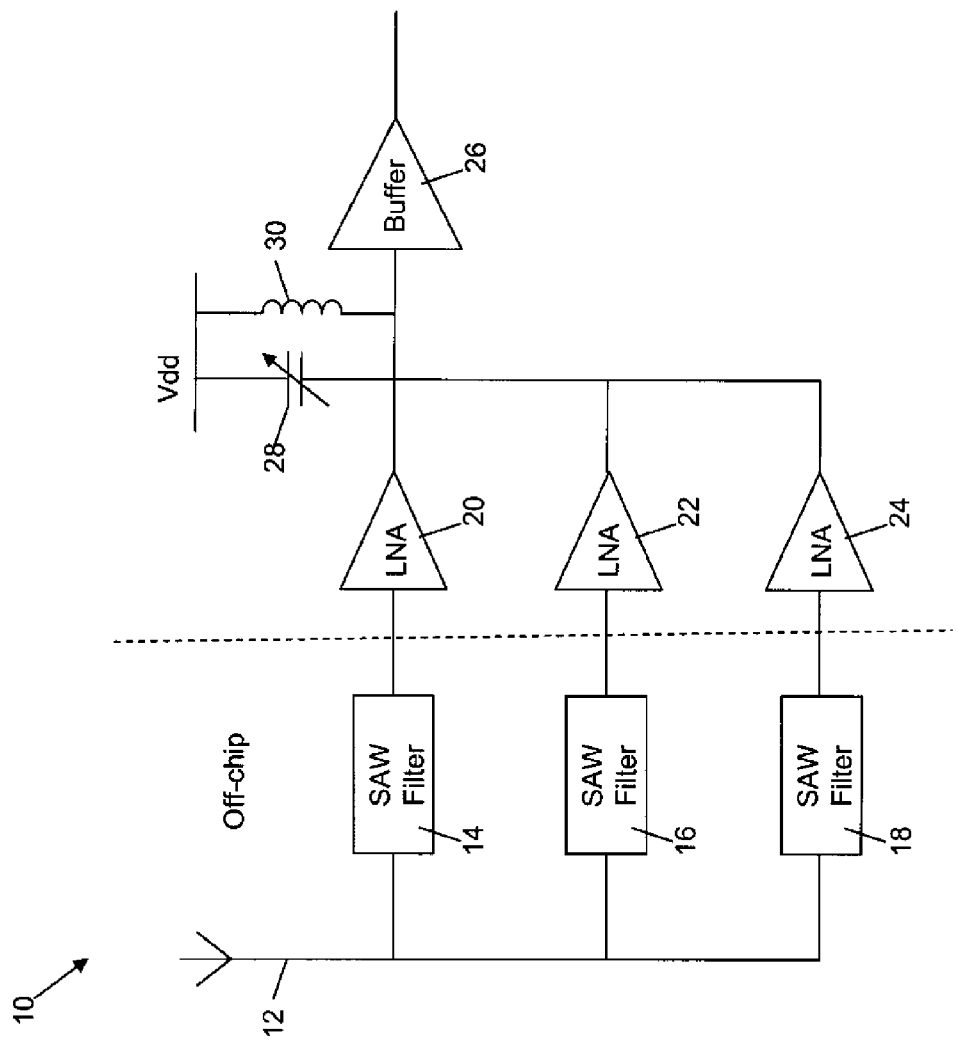
FIG. 1 is a schematic representation of a prior art receiver architecture which uses external SAW filters to attenuate out of band blocking signals.
Figure 2:
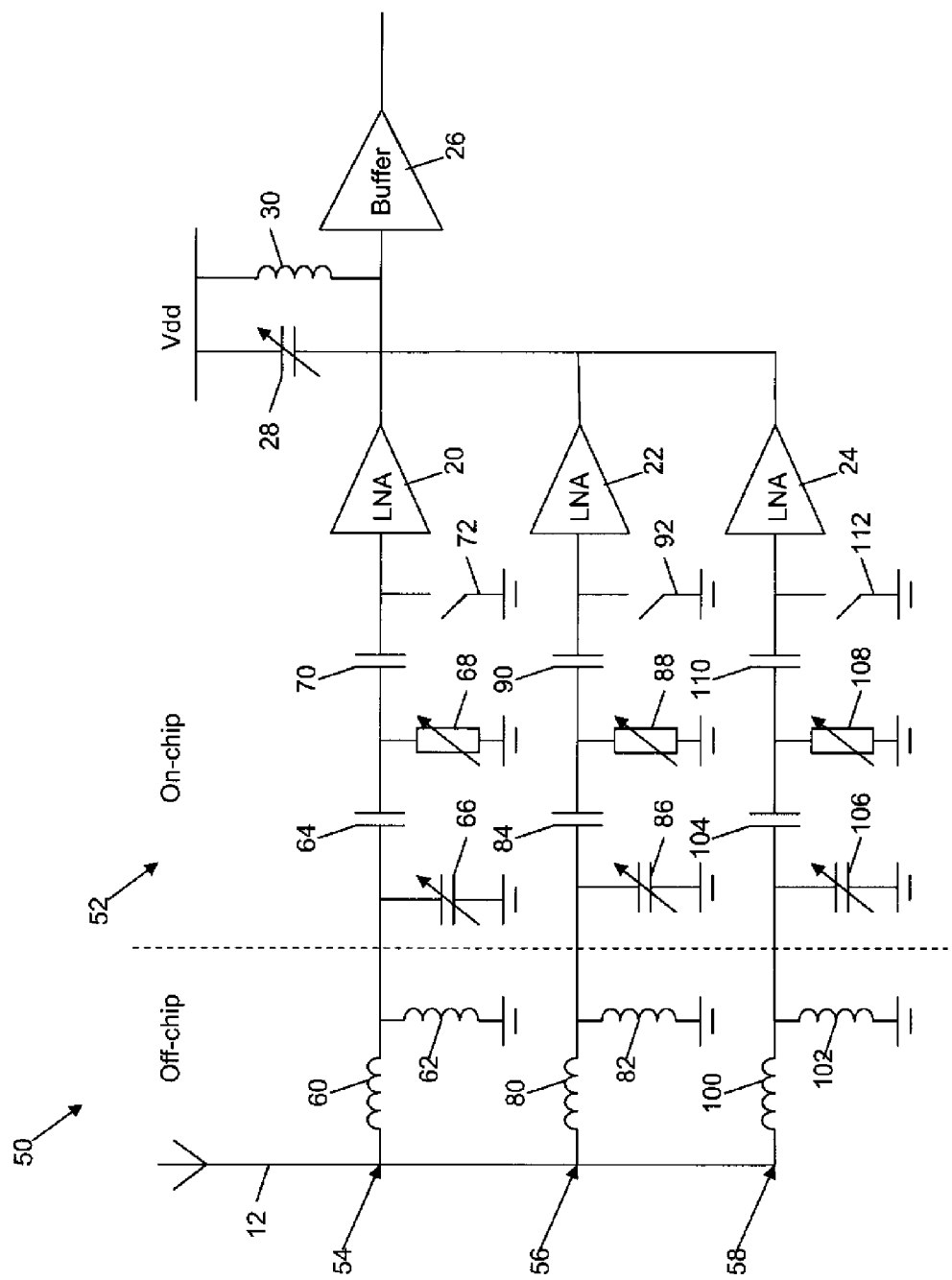
FIG. 2 is a schematic representation showing a receiver architecture suitable for implementing a receiver according to an embodiment of the present invention.

Referring first to FIG. 2, a receiver according to an embodiment of the present invention is shown schematically at 50. The receiver 50 of FIG. 2 has some of the same components as the receiver 10 of FIG. 1, and thus those components that are common to both receivers 50, 10 are denoted in FIG. 2 by the same reference numerals used in FIG. 1.

As in the receiver 10 of FIG. 1, the receiver 50 shown in FIG. 2 has a multi-resonant antenna 12 which is able to receive signals in multiple (e.g. 3) different frequency bands. The receiver 50 also has an integrated circuit (chip) 52 which implements parallel low noise amplifiers (LNAs) 20, 22, 24.

Each of the LNAs 20, 22, 24 is configured to operate in one of the frequency bands of the antenna 12, and has an input which is connected to a one of a plurality of receive paths 54, 56, 58, which in turn are connected to the output of the antenna 12. The receive paths 54, 56, 58 are described in detail below.

The outputs of the LNAs 20, 22, 24 are fed to an input of a common buffer 26, via a common output resonator or tank circuit made up of a variable capacitor 28 and an inductor 30 connected in parallel between a supply voltage and the input of the buffer 26. The common output tank circuit can be tuned using the variable capacitor 28 to select its centre frequency.

As is explained above, the output of the antenna 12 is connected to parallel first, second and third receive paths 54, 56, 58, which are each connected to the input of one of the on-chip LNAs 20, 22, 24. Each of the receive paths 54, 56, 58 includes several passive components, some of which may be provided on the chip 52 which implements the LNAs 20, 22, 24, and some of which may be external to the chip 52.

The first receive path 54 includes a first inductor 60 and a second inductor 62 which are both external to the chip 52. The first inductor 60 has an input terminal which is connected to the output of the antenna 12, and an output which is connected to an input of the second inductor 62, an output of which is connected to ground. The output of the first inductor 60 is also connected to an input of a first capacitor 64 and to an input of a second capacitor 66 (which in this example is a variable capacitor), an output of which is connected to ground. Thus, the first inductor 60 and the first capacitor 64 form a series resonant network (i.e. a series LC filter), whilst the second inductor 62 and the second capacitor 66 form a parallel resonant network (i.e. a parallel LC filter).

The output of the first capacitor 64 is connected to an input of a variable resistor 68, which has an output which is connected to ground and forms a resistive termination of the first receive path 54 in certain circumstances, as will be explained in more detail below. The output of the first capacitor 64 is also connected to an input of a coupling capacitor 70, which couples the output of the first capacitor 64 to the input of the LNA 20.

A switch 72, which may be a transistor for example, is connected between ground and the node formed between the output of the coupling capacitor 70 and the input of the LNA 20 such that when the switch 72 is closed the first receive path 54 terminates at the variable termination resistor 68 rather than at the LNA 20, as is explained in more detail below.

The second and third receive paths 56, 58 take the same form as the first receive path 54. Thus, the second receive path 56 has a series resonant network formed by a first inductor 80 and a first capacitor 84 and a parallel resonant network formed by a second inductor 82 and a second capacitor 86, which in this example is a variable capacitor. A variable resistor 88 is connected between the output of the first capacitor 84 and ground and forms a resistive termination of the second receive path 56 in certain circumstances. The output of the first capacitor 84 is also connected to the input of a coupling capacitor 90 which couples the output of the first capacitor 84 to the input of the LNA 22. A switch 92, which may be a transistor for example, is connected between the output of the coupling capacitor 90 and ground such that when the switch 92 is closed the second receive path 56 terminates at the variable termination resistor 88 rather than at the LNA 22, as is explained in more detail below.

Similarly, the third receive path 58 has a series resonant network formed by a first inductor 100 and a first capacitor 104 and a parallel resonant network formed by a second inductor 102 and a second capacitor 106, which in this example is a variable capacitor. A variable resistor 108 connected between the output of the first capacitor 104 and ground and forms a resistive termination of the third receive path 58 in certain circumstances. The output of the first capacitor 104 is also connected to the input of a coupling capacitor 110 which couples the output of the first capacitor 104 to the input of the LNA 24. A switch 112, which may be a transistor for example, is connected between the output of the coupling capacitor 110 and ground such that when the switch 112 is closed the third receive path 58 terminates at the variable termination resistor 108 rather than at the LNA 24, as is explained in more detail below.

The first, second and third receive paths 54, 56, 58 are each tuned to pass signals in a particular frequency band that can be received by the antenna 12, and to attenuate signals in other frequency bands that can be received by the antenna 12. For example, the antenna 12 may be able to receive signals in the 900 MHz, 1800 MHz and 2.4 GHz frequency bands.

Thus, the first receive path 54 may be tuned, by selection of the values of the first inductor 60 and the first capacitor 64, to pass signals in a first frequency band $f_1$ by providing a low impedance path from the antenna 12 to the input of the LNA 20 whilst presenting a high impedance path to signals outside the first frequency band $f_1$, which may be, for example, the 900 MHz frequency band.

The second receive path 56 may be tuned, by selection of the values of the first inductor 80 and the first capacitor 84, to pass signals in a second frequency band $f_2$ by providing a low impedance path from the antenna 12 to the input of the LNA 22 whilst presenting a high impedance path to signals outside the second frequency band $f_2$, which may be, for example, the 1800 MHz frequency band.

Similarly, the third receive band 58 may be tuned, by selection of the values of the first inductor 100 and the first capacitor 104 to pass signals in a third frequency band $f_3$ by providing a low impedance path from the antenna 12 to the input of the LNA 24 whilst presenting a high impedance path to signals outside the third frequency band $f_3$, which may be, for example, the 2.4 GHz frequency band.

The operation of the receiver 50 will now be explained with reference to FIG. 3, in which the reference numerals used in FIG. 2 have been used to refer to like components shown in FIG. 3.

The switches 72, 92, 112 allow a particular one of the receive paths 54, 56, 58 to be selected. In the example illustrated in FIG. 3 the switches 92, 112 of the second and third receive paths 56, 58 are closed, such that the second and third receive paths 56, 58 terminate at the variable resistors 88, 108 respectively. The switch 72 of the first receive path 54 remains open however, providing a path from the antenna 12 to the LNA 20. Thus, the first receive path 54 is selected in the example illustrated in FIG. 3, but it will be appreciated that the second receive path 56 could be selected by closing the switches 72, 112 of the first and third receive paths 54, 58 and opening the switch 92 of the second receive path 56. Similarly, the third receive path 58 can be selected by closing the switches 72, 92 of the first and second receive paths 54, 56 and opening the switch 112 of the third receive path 58.

Figure 3:
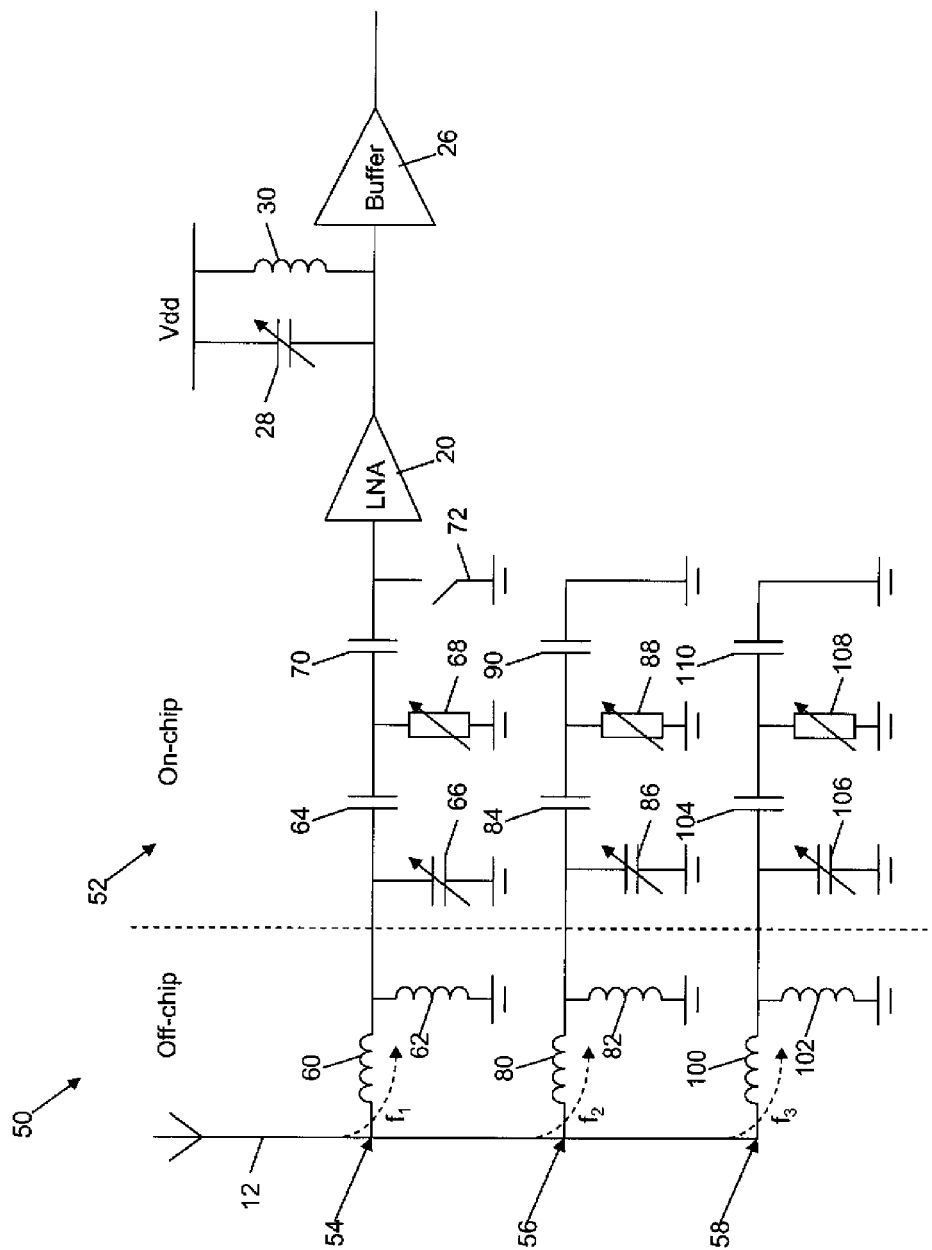
FIG. 3 is a schematic diagram illustrating the operation of the receiver architecture of FIG. 2.

In the example of FIG. 3 the first receive path 54 is selected and provides a low impedance path from the antenna 12 to the LNA 20 to signals in the first frequency band $f_1$. When the first receive path 54 is selected in this way the LNA 20 is powered up and the LNAs 22, 24 are in a power-down mode, and are not shown in FIG. 3 for clarity. The output tank made up of the variable capacitor 28 and the inductor 30 is tuned to the first frequency band $f_1$ by selecting an appropriate value for the variable capacitor 28.

The series resonant network made up of the first inductor 60 and the first capacitor 64 provides a low impedance path to the input of the LNA 20 for a signal received in the first frequency band $f_1$ by the antenna 12, and thus the received signal in the first frequency band is amplified by the LNA 20 and is passed to the buffer 26.

The series resonant network formed by the first inductor 60 and the first capacitor 64 of the first receive path presents a high impedance path to out of band blocking signals received in the second frequency band $f_2$ by the antenna 12. However, the series resonant network of the second receive path 56, formed by the first inductor 80 and the first capacitor 84, provides a low impedance path to out of band blocking signals in the second frequency band $f_2$, and thus such signals pass to the termination resistor 88.

Similarly, the series resonant network formed by the first inductor 60 and the first capacitor 64 of the first receive path 54 presents a high impedance path to out of band blocking signals received in the third frequency band $f_3$ by the antenna 12. However, the series resonant network of the third receive path 58, formed by the first inductor 100 and the first capacitor 104, provides a low impedance path to out of band blocking signals in the second frequency band $f_3$, and thus such signals pass to the termination resistor 108.

It will be appreciated that the same principles apply when either the second or third receive path 56, 58 is selected as the active receive path. Thus, when a signal in the second frequency band $f_2$ is the desired signal, the second receive path 56 is selected by appropriate configuration of the switches 72, 92, 112. The LNA 22 is powered up, the LNAs 20, 24 are powered down and the output tank is tuned to the second frequency band $f_2$ by selecting an appropriate value for the variable capacitor 28.

Signals received by the antenna 12 in the second frequency band are passed, via the series resonant network formed by the first inductor 80 and the first capacitor 84 of the second receive path 56, to the LNA 22 and subsequently to the buffer 26. Signals in the first frequency band $f_1$ are passed, via the series resonant network formed by the first inductor 60 and the first capacitor 64 of the first receive path 54 to the termination resistor 68. Similarly, signals in the third frequency band $f_3$ are passed, via the series resonant network formed by the first inductor 100 and the first capacitor 104 of the third receive path 58 to the termination resistor 108.

When the third receive path 58 is selected as the active receive path, by appropriate configuration of the switches 72, 92, 112, the LNA 24 is powered up, the LNAs 20, 22 are powered down and the output tank is tuned to the second frequency band $f_3$ by selecting an appropriate value for the variable capacitor 28.

Signals received by the antenna 12 in the third frequency band $f_3$ are passed, via the series resonant network formed by the first inductor 100 and the first capacitor 104 of the third receive path 58, to the LNA 24 and subsequently to the buffer 26. Signals in the first frequency band $f_1$ are passed, via the series resonant network formed by the first inductor 60 and the first capacitor 64 of the first receive path 54 to the termination resistor 68. Similarly, signals in the second frequency band $f_2$ are passed, via the series resonant network formed by the first inductor 80 and the first capacitor 84 of the second receive path 56 to the termination resistor 88.

Thus, in the receiver 50 illustrated in FIGS. 2 and 3, signals received in frequency bands outside of the frequency band of interest, which may act to block or interfere with signals in the frequency band of interest, are diverted away from the active receive path 54, 56, 58, thereby reducing their impact on the desired signal. This is achieved using inexpensive passive components instead of costly SAW filters as used in known receiver architectures.

The second inductors 62, 82, 102 form with the second capacitors 66, 86, 106, parallel resonant networks, which are tuned by selection of an appropriate value for the second (variable) capacitors 66, 86, 106 to reduce the effects of parasitic capacitance in the receive paths 54, 56, 58 which may exist at input pads of the chip 52.

The termination resistors 68, 88, 108 may be implemented as passive devices or as active devices, and their values are selected to obtain a good compromise between attenuation of the out of band blocking signals that pass through them when their respective receive paths 54, 56, 58 are inactive and noise performance.

In the exemplary embodiments of FIGS. 2 and 3 the inductors 60, 62, 80, 82, 100, 102 are shown as being external to the chip 52, which reduces the silicon area required for the chip 56. However, the inductors 60, 62, 80, 82, 100, 102 could equally be provided as on-chip devices if necessary or desired.

It will be appreciated from the foregoing that the present invention can be used to provide a multi-band receiver architecture which can strongly attenuate out-of-band blocking signals without using costly SAW filters.

The invention claimed is:

1. A receiver comprising:
   an antenna for receiving signals in a plurality of frequency bands;
   an integrated circuit including a plurality of amplifiers, wherein each of the plurality of amplifiers is configured to amplify signals in one of the plurality of frequency bands; and
   a plurality of selectable receive paths, each of the plurality of selectable receive paths connecting an output of the antenna to an input of a respective one of the plurality of amplifiers and including a resonant circuit, wherein each of the plurality of selectable receive paths is selectable by means of a switch which, when closed, connects the receive paths to ground so as to deselect the receive path, and wherein the resonant circuit of each of the selectable receive paths includes an inductor which is internal to the integrated circuit.

2. A receiver according to claim 1 wherein the resonant circuit includes a capacitor.

3. A receiver according to claim 2 wherein the integrated circuit includes the capacitor.

4. A receiver according to claim 1 wherein the resonant circuit is a series resonant circuit.

5. A receiver according to claim 1 further comprising a further resonant circuit for compensating for parasitic capacitance at input pads of the integrated circuit.

6. A receiver according to claim 5 wherein the further resonant circuit is a parallel resonant circuit.

7. A receiver according to claim 5 wherein the further resonant circuit includes a further inductor.

8. A receiver according to claim 7 wherein the further inductor is external to the integrated circuit.

9. A receiver according to claim 5 wherein the further resonant circuit includes a capacitor.

10. A receiver according to claim 1 wherein the plurality of amplifiers are low noise amplifiers.

11. A receiver comprising:
    an antenna for receiving signals in a plurality of frequency bands;
    an integrated circuit including a plurality of amplifiers, wherein each of the plurality of amplifiers is configured to amplify signals in one of the plurality of frequency bands; and
    a plurality of selectable receive paths, each of the plurality of selectable receive paths connecting an output of the antenna to an input of a respective one of the plurality of amplifiers and including a resonant circuit, wherein each of the plurality of receive paths further comprises a termination resistor connected between the input of the amplifier and ground such that if the receive path is not selected signals from the antenna pass through the termination resistor to ground, and wherein the resonant circuit of each of the plurality of selectable receive paths includes an inductor which is internal to the integrated circuit.

12. A receive according to claim 11 wherein the termination resistor is a passive device.

13. A receiver according to claim 11 wherein the termination resistor is an active device.

* * * * *